United States Patent
Garcia

Patent Number: 5,908,021
Date of Patent: Jun. 1, 1999

[54] ENGINE PREHEATER

[76] Inventor: Jaime Garcia, 710 E. Pitts, Pasadena, Tex. 77506

[21] Appl. No.: 08/996,643

[22] Filed: Dec. 23, 1997

Related U.S. Application Data

[63] Continuation-in-part of application No. 08/775,003, Dec. 27, 1996, abandoned.

[51] Int. Cl.$^6$ ................................................. F02M 31/00
[52] U.S. Cl. .......................................... 123/549; 123/556
[58] Field of Search .................................... 123/556, 549, 123/179.21, 195 A, 195 E

[56] References Cited

U.S. PATENT DOCUMENTS

| | | | |
|---|---|---|---|
| 3,397,684 | 8/1968 | Scherenberg | 123/556 |
| 3,526,214 | 9/1970 | Kamo . | |
| 3,569,724 | 3/1971 | Kuehn, III et al. . | |
| 3,630,182 | 12/1971 | Grainger | 123/556 |
| 3,630,183 | 12/1971 | Hoffman et al. . | |
| 3,687,122 | 8/1972 | Kamo . | |
| 3,765,389 | 10/1973 | Henchel . | |
| 3,977,376 | 8/1976 | Reid et al. . | |
| 3,990,421 | 11/1976 | Grainger | 123/556 |
| 4,020,815 | 5/1977 | Hubert | 123/556 |
| 4,047,511 | 9/1977 | Takagi | 123/179.21 |
| 4,096,697 | 6/1978 | Treuil | 123/179.21 |
| 4,099,488 | 7/1978 | Damon . | |
| 4,192,274 | 3/1980 | Damon . | |
| 4,289,095 | 9/1981 | Scherr | 123/556 |
| 4,453,524 | 6/1984 | Lee | 123/556 |
| 4,461,249 | 7/1984 | Majkrazak . | |
| 4,658,771 | 4/1987 | Ravin . | |
| 4,706,644 | 11/1987 | Nakai . | |
| 4,744,747 | 5/1988 | Kawamura et al. . | |
| 5,003,941 | 4/1991 | Jeffrey, Jr. et al. . | |

*Primary Examiner*—Marguerite McMahon
*Attorney, Agent, or Firm*—Rita M. Irani

[57] ABSTRACT

A compact preheater for heating air before it is fed to the intake of an internal combustion engine that is adaptable to fit within existing space in an engine compartment, including a versatile mounting system. The preheater includes heating coils and a blower adapted to be powered by an engine battery, with a timer to automatically de-power the heater after a predetermined time. The preheater can be used as an add on part without any alteration or change in existing engine parts.

9 Claims, 3 Drawing Sheets

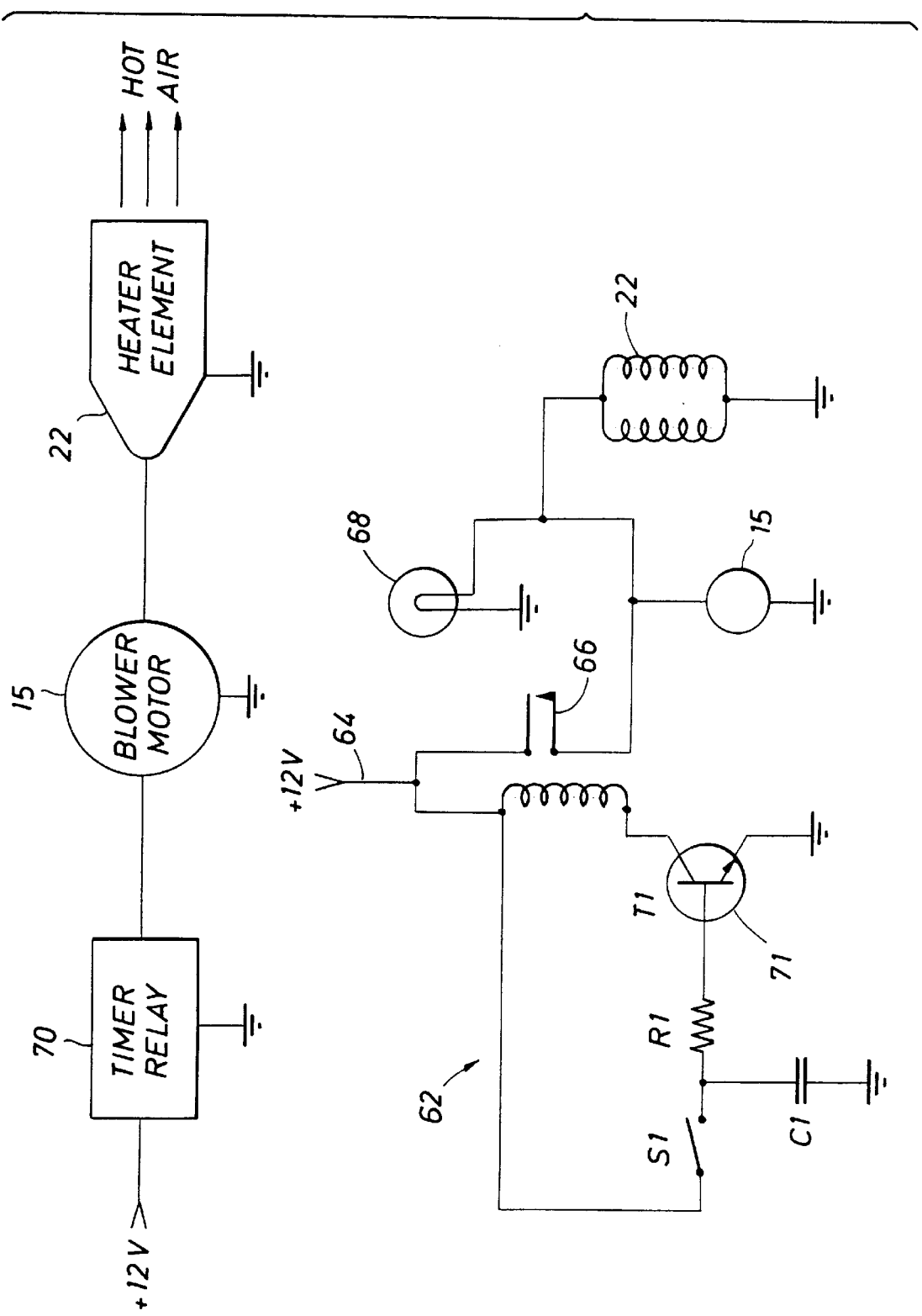

ENGINE PREHEATER

RELATED APPLICATIONS

This is a continuation-in-part of U.S. application Ser. No. 08/775,003 filed Dec. 27, 1996 now abandoned of the same title and by the same inventor, the contents of which prior application is hereby incorporated by reference.

BACKGROUND OF THE INVENTION

1. Field of the Invention

This invention relates to internal combustion engines and in particular to an apparatus for preheating air delivered to a cold engine.

2. Description of the Related Art

The problem of starting an internal combustion engine in cold weather conditions is well known. Various attempts to solve the problem have met with limited success. Most approaches to the problem have involved using some type of burner device to increase the air temperature within the cylinders to move that temperature into the range needed for combustion. The problem is particularly acute with diesel engines in which combustion in the cylinders is induced by the heat produced by compression of the air-fuel mixture.

For example, U.S. Pat. Nos. 3,526,214 and 3,687,122 to Kamo disclose a combustion aid for compression ignition engines. These complicated combustion aids includes a fuel burner for burning engine fuel located in the air intake of the engine and a distributing means mounted within the air intake for distributing the hot gases that are generated from the products of combustion. Significant engine modification is needed to use the Kamo devices.

Similarly, U.S. Pat. No. 3,630,183 to Hoffman shows a complex diesel engine manifold air preheater. The Hoffman device includes an elongated burner tube mounted in and running lengthwise along the manifold and a burner head assembly which includes a spark plug and fuel nozzle for preheating the air to the manifold.

U.S. Pat. No. 3,765,389 to Henchel discloses yet another burner type heater apparatus with controlled air and fuel intake. This engine preheater apparatus comprises an air delivery system, burner apparatus, chimney heat exchanger apparatus, coolant jacket apparatus, and a fuel system. Another air intake preheater involving the burning of diesel fuel is disclosed in U.S. Pat. No. 3,977,376 to Reed, et al. The Reed preheater includes a metering and control system for supplying fuel to a burner nozzle of a burner assembly which preheats intake air in a diesel engine. Another diesel burning preheater and control system is disclosed in U.S. Pat. Nos. 4,099,488 and 4,192,274 to Damon. The Damon systems involves heating the engine coolant and using the heated coolant to heat the engine block. U.S. Pat. No. 4,706,644 to Nakai involves a two-stage heat exchanger, blower, coolant pump, and fuel pump that work in combination to heat the engine coolant in the heat exchanger.

U.S. Pat. No. 4,744,747 to Kawamura, et al., discloses a heater controller. The Kawamura device includes an atomizing glow plug for atomizing fuel and an ignition glow plug for igniting the atomized fuel. U.S. Pat. No. 5,003,941 to Jeoffrey, Jr., et al., discloses a gas fired system involving a heat exchange for heating engine coolant.

Implementing any one of these systems involves significant design changes to the engine which makes them unsuitable for a retrofit of an existing engine. It would therefore be desirable to have a simple device that would provide additional heat for combustion in cold weather conditions that can be used on virtually any internal combustion engine.

SUMMARY OF THE INVENTION

The present invention provides a self-contained engine preheater which can be powered by the engine's battery and manually activated from the lead to be mounted adjacent the switch 66. A timer 70 controlled by relay switch 71 for the invention includes one or more air blowers for blowing air over heating coils and a control system, all conveniently and compactly arranged and mounted together into a preheater unit. The invention further includes a mounting assembly including a clamp which can be secured about the blower housing in any radial position and which has mounted to it a rod clamp for securing a connection rod. The connection rod has an eyelet for securing to an existing engine bolt and the rod clamp can position the eyelet a desired spacial distance from the rod clamp. Thus the mounting assembly provides great flexibility in securing the preheater within space available in an engine compartment. Flexible tubing, which can be cut to a desired length, provides a convenient way to channel the heated air from the preheater to the engine air intake to the combustion chamber, preferable into the air filter intake. The control system preferably includes a timer controlled relay within a control box mounted to the air blower and heating coil assembly to provide for automatic shut off of the preheater after a predetermined period of time.

BRIEF DESCRIPTION OF THE DRAWING

FIG. 4 is a schematic illustration of the power and control circuit suitable for use in the invention.

DETAILED DESCRIPTION OF A PREFERRED EMBODIMENT

Figure 1:
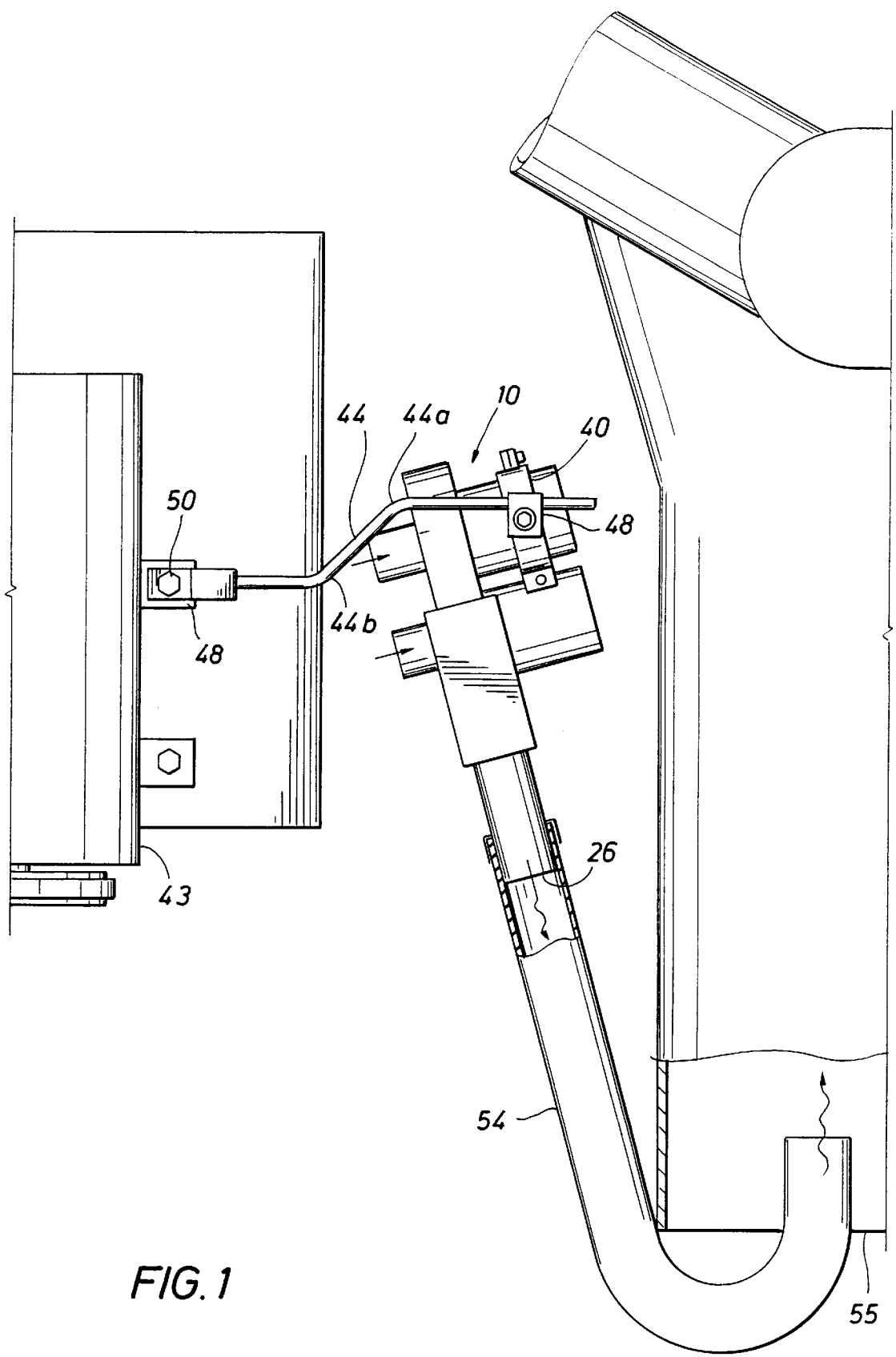
FIG. 1 is a plan view showing the invention mounted to an engine part and feeding warmed air to the engine intake.
Figure 2:
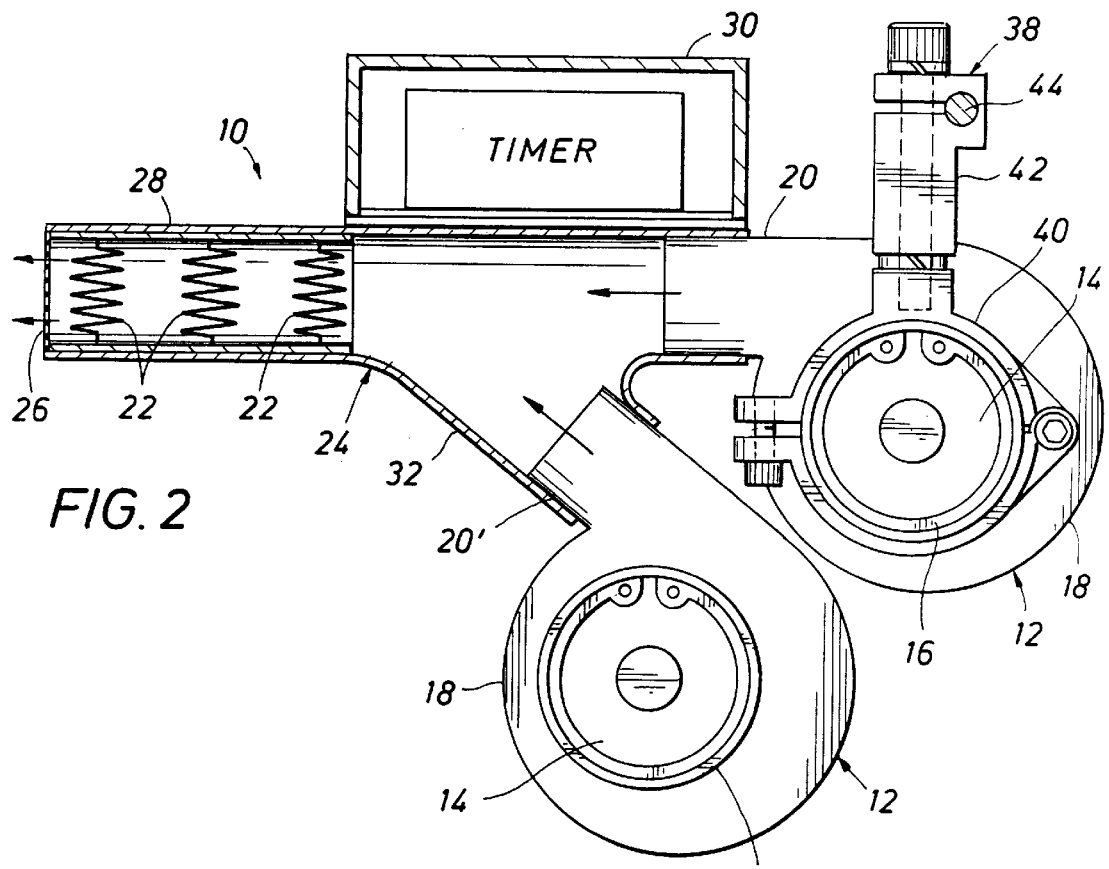
FIG. 2 is a side view, partly in cross section, of the preheater embodiment of FIG. 1.
Figure 3:
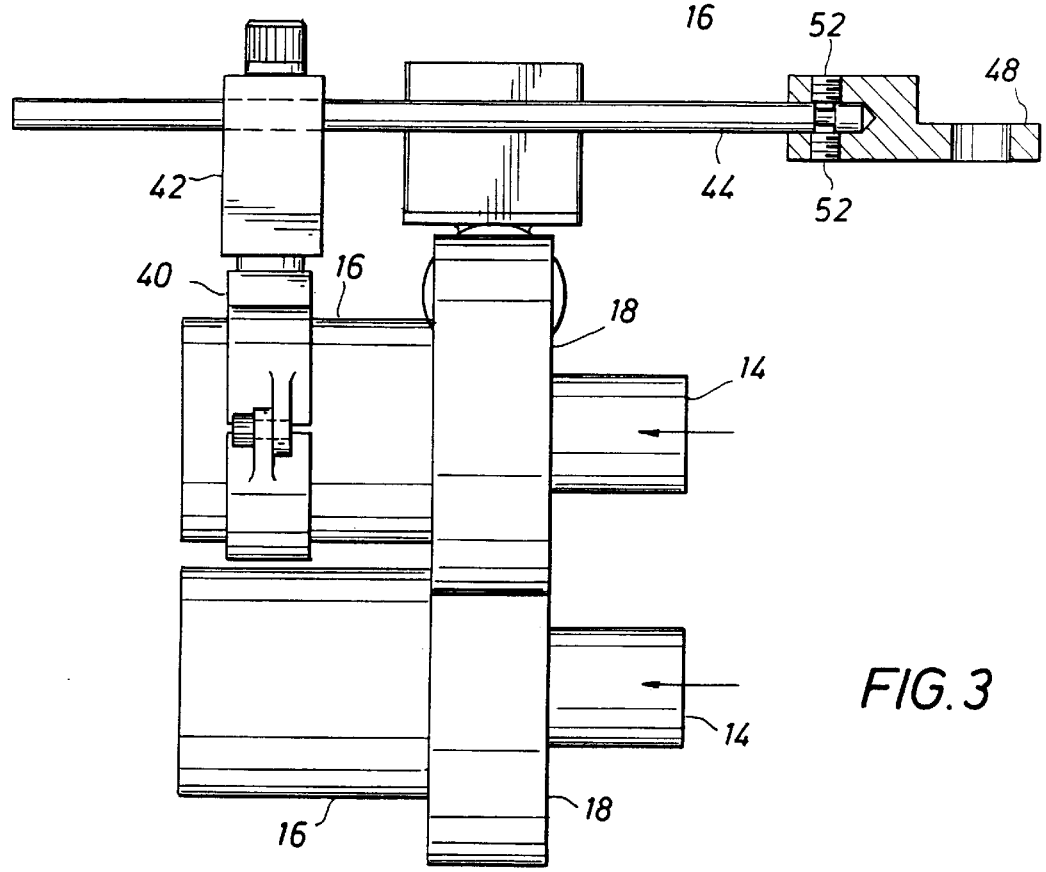
FIG. 3 is a rear view of the preheater of FIG. 2.

The preferred embodiment of the engine preheater of the instant invention is shown in the Drawing as preheater 10 which includes two air blowers 12, each including an air inlet port 14 and a blower motor 15 (shown schematically in FIG. 4) housed in a motor housing 16. The blower motor 15 drives fan blades (not shown) which are housed in blade housing 18. Each of the blowers 12 further includes a tubular air outlet barrel, such as the blower outlet barrels 20 and 20', for sending air toward and over heating coils 22. A rigid tubular connecter 24 mounts each of the blower outlet barrels 20 and 20' as well as containing the heating coils 22 to provide an air passageway to direct all of the air generated by the blowers 12 over the heating coils 22 and out of hot air outlet 26. The tubular connector 24 includes a long leg 28 for containing the heating coils 22 at one end and for mounting the blower outlet barrel 20 at its opposing end. The long leg 28 also conveniently serves to mount control box 30. Short leg 32 of the connector 24 mounts the other blower outlet barrel 20'.

Mounting assembly 38 is provided for mounting the preheater 10 to an engine frame or engine part. The assembly 38 includes a split ring clamp 40, sized to fit about one of the blower motor housings 16, a post clamp 42 mounted to the perimeter of the ring clamp 40 and a connection rod 44 sized to be secured within the post clamp 42. The split ring clamp 40 as shown in the Drawing is available from Grinnel Corporation. As best shown in FIG. 1, to provide for additional flexibility in securing the preheater 10 to an engine frame or part, such as engine part 43, the connection rod 44 can include one or more bends, e.g. at 44a and 44b. Eyelet 48 is provided for mounting on the distal end of the connection rod 44 which provides the means for securing the preheater 10 to an engine part, e.g. by placing the eyelet 48 between any conveniently located engine compartment bolt and its securing nut or plate, such as bolt 50 in FIG. 1. Set screws 52 secure the eyelet 48 to the connection rod 44. Any available bolt that mounts any engine part that is located in reasonable proximity to the engine's air filter can be used to pass through the eyelet 48 and to secure the connection rod 44 in place, thereby securing the preheater 10 within the engine compartment. If no convenient bolt is available, one could be added to any frame or wall part that has space to drill a bolt hole.

As can now be appreciated, the preheater of the invention, with its combination of the ability to locate the ring clamp 40 in any radial position about the motor housing 16, to orient the connection rod 44 with its bends in any radial position within the post clamp 42, and to orient the engine mounting eyelet 48 in any radial position relative to the connection rod 44, and to use as much or little of the connection rod's length between its post clamp and the engine bolt 50, provides a large number of degrees of freedom for positioning the preheater 10 in some available space, and securing it to some available engine bolt, within virtually any engine compartment. Rubber tubing 54 connected to the hot air outlet 26 provides the means for sending heated air to the engine's air intake port 55.

With reference to FIG. 4, power control system 62, contained primarily within control box 30, can be any suitable system for using a 12 volt engine battery, such as battery 64, to power a fan motor and heater coils. An on/off switch 66 is preferably provided with lead wires of a length suitable for mounting the switch 66 in the passenger compartment of a vehicle, at a convenient location on the dashboard. Indicator light 68 may also be provided with a similarly long lead to be mounted adjacent the switch 66. A timer controlled relay switch 68 for automatically shutting off the heating coils 26 and blower motors 12 after a predetermined elapsed time may be a desirable feature to assure that the heater is used only as long as needed for preheating incoming air to the engine.

To protect the control system elements, the control box 30 contains the elements of the control system. The box is preferably mounted to the connector leg 20 in a way that will withstand the jarring motions of a vehicle, such as by way of cushioning bushings.

As can now be appreciated, the heater 10 of the instant invention provides a convenient, portable device which can be attached to virtually any diesel or gasoline engine to provide warmed air to the engine by way of the air filter intake. As can also be appreciated, various modifications in the described components of the system can be made without departing from the spirit of the invention. For example, although the above described embodiment used two blowers, a larger capacity blower housed in a single housing could be used. Various types and combinations of clamps, rods and eye mounts can be substituted for the particular parts and combinations described above. Additional flexibility may be provided by using different lengths of connection rods, or a series of rods and connectors can be provided with the control unit and blower assembly so that it can be even more adaptable to different engine compartment spaces. As can be appreciated the hot air should be supplied as close as possible to the combustion chamber. For this reason, the tube 54 could be inserted either into an existing opening to the filter, or could be inserted immediately before or directly into the air filter. Additionally, the preheater could include its own filter so that hot air can be provided directly to the engine's air manifold. Any suitable continuous or discontinuous electrically powered heating element can be used in place of the heating coils described above. Further modifications and substitutions will be apparent to those in the art which would not depart from the spirit of the invention, the scope of which is defined by the following claims.

What is claimed is:

1. An electrically powerable preheater assembly for an internal combustion engine wherein the engine is mounted within an engine compartment and wherein the compartment contains a plurality of engine parts, each part secured to another part or to the compartment by bolts, the assembly comprising:

a preheater including
      a heating element mounted within an air passageway, and
      an air blower within a blower housing for providing air to the air passageway, the blower including a blower motor and fan blades driven by the blower motor;
   a control system operatively connected to the heating element and the air/blower for selectively powering the heating element and the air blower; and
   a mounting assembly for mounting the preheater within an engine compartment, the assembly including
      a clamp for mounting about the blower housing,
      a connection rod, and
      a rod clamp for joining the connection rod to the blower housing clamp such that each of the blower housing clamp and rod clamp can be secured in a variety of positions relative to the blower housing, the rod clamp having an eyelet mounted adjacent a distal end thereof, which eyelet is sized to fit about, and be secured by, one of the engine compartment bolts.

2. The assembly of claim 1 wherein the connecting rod includes at least one bend.

3. The assembly of claim 1 wherein the blower housing clamp is a split ring clamp and the rod clamp is adapted to be secured to the perimeter of the split ring clamp.

4. The assembly of claim 1 wherein the control system includes a remote switch for selectively powering the preheater and a timer operatively connected to the switch for cutting off power to the preheater after a predetermined elapsed time.

5. The assembly of claim 1 wherein the air blower includes two air blowers mounted together to the air passageway.

6. The assembly of claim 1 wherein the control system is mounted within a control housing which housing is mounted to the blower housing.

7. The assembly of claim 1 wherein the heating element is a heating coil.

8. An electrically powerable preheater assembly for an internal combustion engine wherein the engine is mounted within an engine compartment and wherein the compartment contains a plurality of engine parts, the preheater assembly comprising:

a) a preheater including
      i) a heating element mounted within an air passageway,
      ii) an air blower within a blower housing for providing air to the air passageway, the blower including a blower motor and fan blades driven by the blower motor, and iii) a control system operatively connected to the heating element and the air blower for selectively powering the heating coil and the air blower; and b) a mounting assembly for mounting the preheater within the engine compartment wherein the mounting assembly includes i) a connection rod, ii) a preheater clamp for securing the connection rod to the preheater, and, iii) a rod clamp for joining the connection rod to the preheater clamp such that the preheater clamp and the rod clamp can be secured in a variety of positions relative to the preheater.

9. The assembly of claim 8 wherein the connection rod includes at least one bend.

* * * * *